July 8, 1930. C. D. KOCH 1,770,276
REFRIGERATOR FOR MOVING VEHICLES
Filed Oct. 3, 1928 2 Sheets-Sheet 1
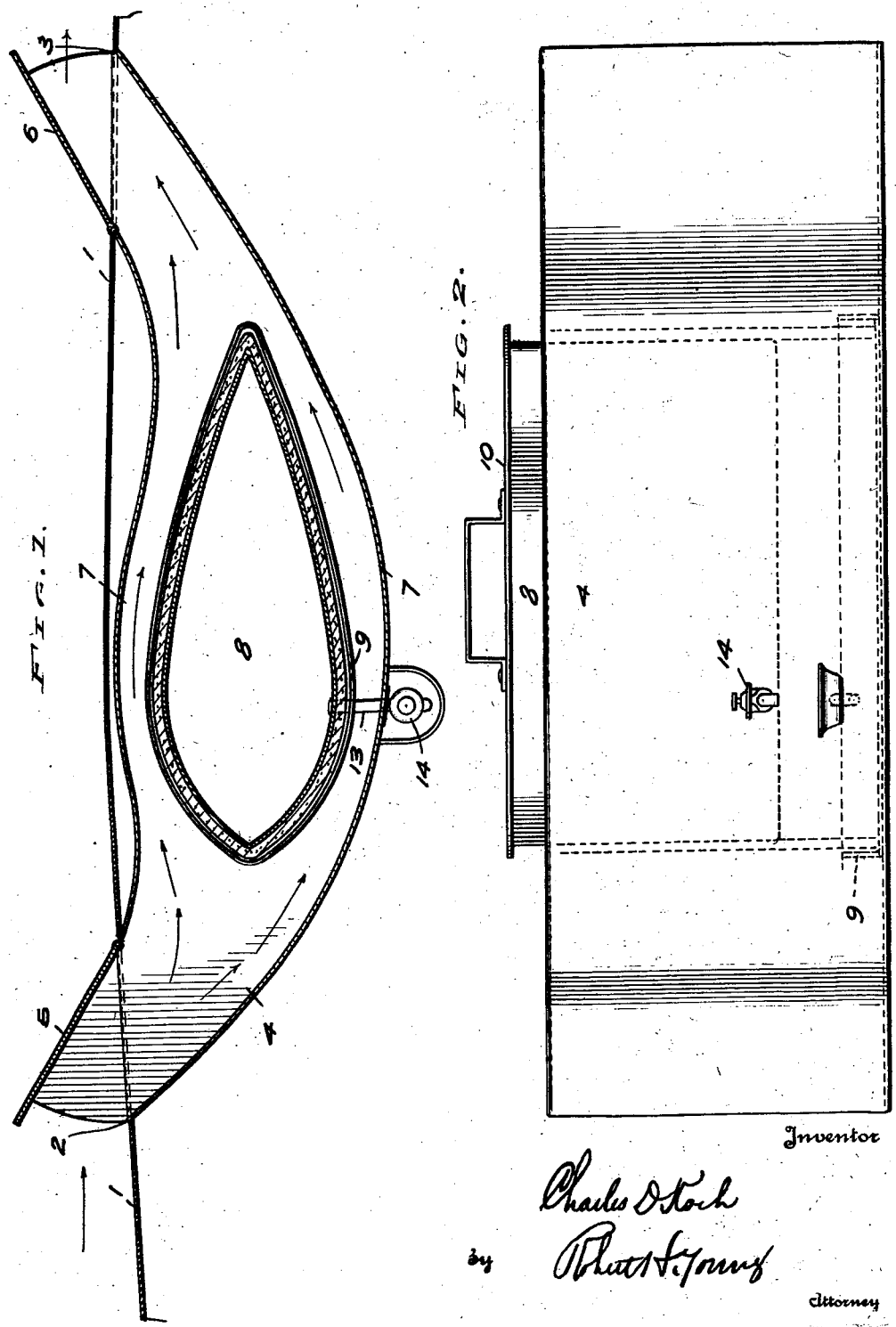
Inventor
Charles D Koch
by Robert H Young
Attorney July 8, 1930. C. D. KOCH 1,770,276
REFRIGERATOR FOR MOVING VEHICLES
Filed Oct. 3, 1928 2 Sheets-Sheet 2
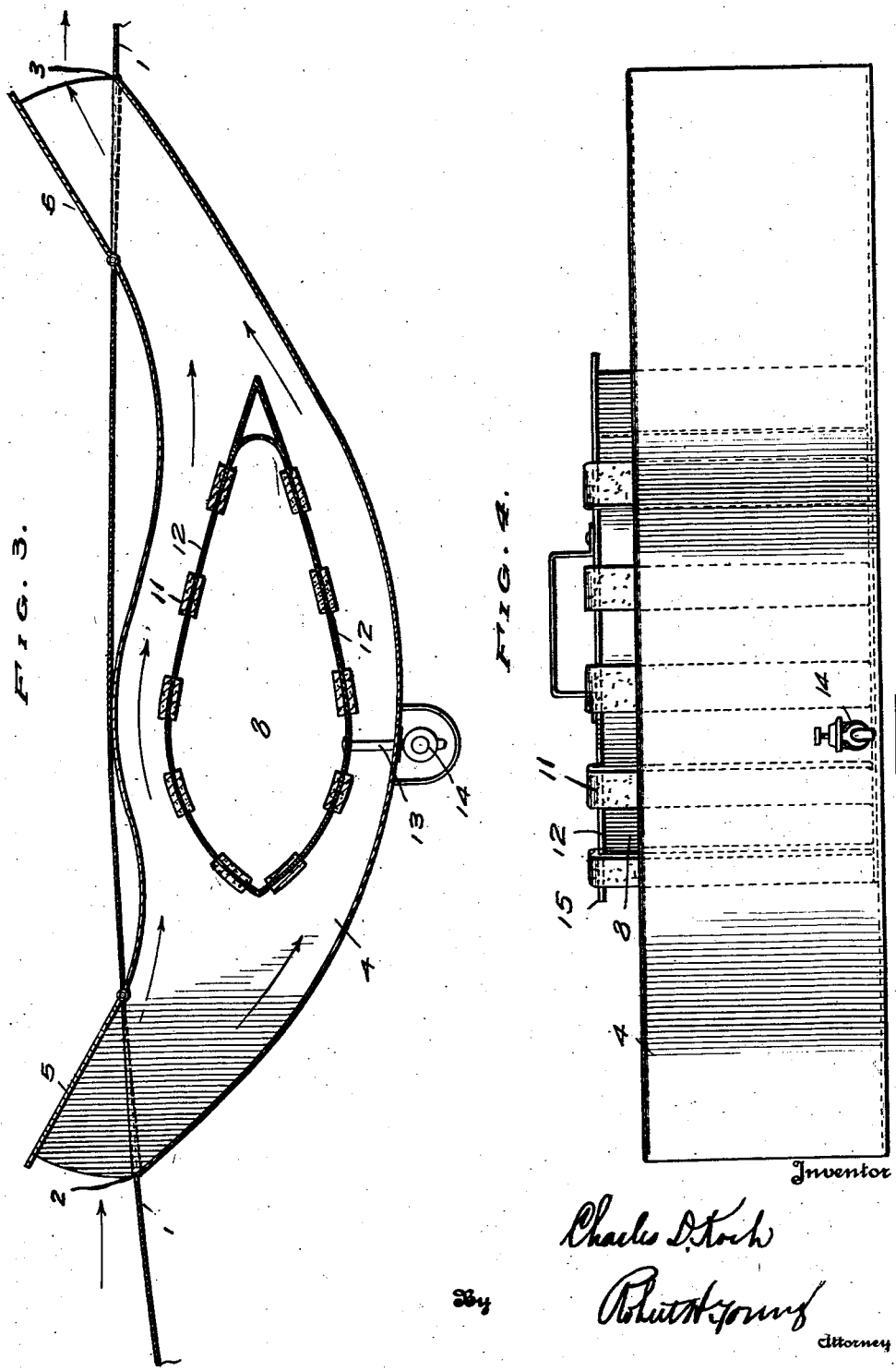

Patented July 8, 1930

1,770,276

UNITED STATES PATENT OFFICE

CHARLES D. KOCH, OF TORRESDALE, PENNSYLVANIA, ASSIGNOR TO KEYSTONE AIRCRAFT CORPORATION, OF BRISTOL, PENNSYLVANIA, A CORPORATION OF DELAWARE

REFRIGERATOR FOR MOVING VEHICLES

Application filed October 3, 1928. Serial No. 309,929.

This invention relates primarily to a system for cooling drinking water on airplanes, airships, steamships, trains or other fast moving vehicles, and has for its object the employment of the principle of evaporation for cooling a water or other receptacle by the use of a novel construction and arrangement of parts.

With this object in view the invention consists broadly in providing an air duct or passage so arranged in connection with the skin or surface of an airplane, airship or the like, as to receive in said duct or passage a rapidly moving column of air, and in interposing in said air duct or passage a water or like receptacle having contiguous means for exposing to the rapidly moving air in the air duct or passage a fluid such as water to be rapidly evaporated by the continuous passage of air through the air duct or passage at high velocity.

The invention further consists in certain details of construction and combinations of parts, all of which will be first fully described and afterwards specifically pointed out in the appended claims.

Referring to the accompanying drawings:

Fig. 1 is a horizontal sectional view through the skin or surface of an airplane, airship or the like and through the cooling system.

Fig. 2 is a side elevation of the cooling system.

Fig. 3 is a horizontal sectional view through the skin or surface of an airplane, airship or the like and through a modified construction of the cooling system, and Fig. 4 is a side elevation of such modified system.

Like numerals of reference indicate the same parts throughout the several figures, in which:

1 indicates the skin of an airship or the like having therein two openings 2 and 3 arranged one behind the other.

Connecting said openings and lying on the inside of the airship or the like, is an air duct or passage 4, having at each end adjustable gates 5 and 6 formed like scoops, by means of which the quantity and velocity of air passing into the air duct or passage may be controlled.

In the two embodiments of the invention shown in the drawings, the air duct or passage 4 is swelled at its central portion at 7, so as to accommodate therein a stream line shaped water or other receptacle 8. The said receptacle divides the column of air within the air duct or passage, into two air streams, the combined cross sectional area of which is less than the area of the air duct or passage 4 in front of and behind the receptacle 8. This creates a Venturi action and increases the velocity of air flow along the sides of the receptacle 8.

As shown in Fig. 2, the receptacle 8 may be positioned directly above an evaporation tank 9, and the receptacle 8 may have a covering 10 of suitable water or other liquid absorbing material such as felt or the like, which covering enters within the evaporating tank to absorb liquid therefrom.

In the construction shown in Fig. 3 a series of felt wicks or layers 11 are arranged around the inner wall of the receptacle and laying over the top edge 12 of the receptacle extend downwardly on the outside thereof to absorb water from within the receptacle, so as to saturate the same.

Connecting the receptacle 8 near the bottom with the outside of the air duct or passage 4 is a pipe 13 having a spigot 14, by means of which the contents of the tank 8 may be drawn for use.

Having thus described the several parts of the invention, its operation is as follows:

The parts being assembled as shown in the drawings, and a suitable cover or closure 15 being supplied on the tank 8, the rapid movement of the airship or the like through the air causes air to be scooped into the air duct or passage 4 by the adjustable gate 5, the quantity of air entering the air duct or passage being controlled by said gate 5 as well as by the aft gate 6. The rapidity of the evaporation of water on the saturated casing or wicks on the tank 8, and the extent of the cooling action upon the contents of the tank 8 may thus be controlled, it being of course understood that the rapidity of loss of temperature in the tank 8 depends upon the rapidity of this evaporation and the quantity of the liquid evaporated.

It will thus be seen that by this simple arrangement of parts, an efficient water cooling system for airships and the like may be inexpensively supplied without the instrumentality of any moving cooling or refrigerating mechanism.

Having thus fully described the invention, it is to be understood that the same is not to be limited to the exact constructions shown in the drawings and herein described, as various changes and alterations may be made therein, and it is considered that all of such changes and modifications as fall within the limit and scope of the appended claims are clearly within the spirit of the invention.

What is claimed as new and desired to be secured by Letters Patent of the United States is:

1. A water cooling system for airships or the like including a structure forming an air duct for application to the skin of an airship or the like, and having an opening at each end, adjustable gates for each opening, the central portion of the air duct being larger than the end portions thereof, a stream line receptacle within the enlarged portion of the air duct, an evaporation tank within the air duct and under the said receptacle, suitable absorbent material entering said evaporation tank to receive liquid therefrom and disposed on the outer surface of the receptacle, and means connecting the receptacle with the outside of the air duct for discharging the contents of the receptacle.

2. A water cooling system for airships or the like, including a structure forming an air duct for application to the skin of an airship or the like and having an intake opening and an exhaust opening, adjustable gates for each opening, a stream line receptacle within the air duct, an evaporation tank within the air duct and under the said receptacle, suitable absorbent material entering said evaporation tank to receive liquid therefrom, and disposed on the outer surface of the receptacle, and means connecting the receptacle with the outside of the air duct for discharging the contents of the receptacle.

3. A water cooling system for airships or the like including a structure forming an air duct for application to the skin of an airship or the like and having an intake opening and an exhaust opening, means at the intake opening for leading air into the air duct, a receptacle within the air duct, an evaporation tank within the air duct and under the receptacle, a suitable absorbent material entering said evaporation tank to receive liquid therefrom and disposed on the outer surface of the receptacle, and means for drawing the contents from the receptacle.

4. A water cooling system for airships or the like including a structure forming an air duct for application to the skin of an airship or the like and having an intake and an exhaust opening, means for controlling the quantity of air passing into the air duct, a receptacle within the air duct, suitable absorbent material on the outer surface of the receptacle, an evaporation tank for supplying a liquid to the absorbent material, and means for drawing the contents from the receptacle.

In testimony whereof I affix my signature.

CHARLES D. KOCH.